United States Patent [19]
Garcia

[11] Patent Number: 6,052,936
[45] Date of Patent: Apr. 25, 2000

[54] LINE RETAINING DEVICE FOR THE RECOVERING OF LINE IN FLY CASTING

[76] Inventor: Juan Pablo Garcia, Avda. Roca 274, 8328 Allen, Rio Negro, Argentina

[21] Appl. No.: 08/932,341

[22] Filed: Sep. 17, 1997

[30] Foreign Application Priority Data

Oct. 18, 1996 [AR] Argentina ................. P 96 01 04804

[51] Int. Cl.[7] ............................ A01K 91/06; A01K 97/16
[52] U.S. Cl. ................................ 43/4; 224/269; 224/248; 24/2.5; 24/545
[58] Field of Search ................. 43/4; 24/29, 2.5, 24/300, 545; 224/920, 269, 248

[56] References Cited

U.S. PATENT DOCUMENTS

| | | |
|---|---|---|
| 488,009 | 12/1892 | Housser . |
| 653,051 | 7/1900 | Woods . |
| 1,004,392 | 9/1911 | Ehrlich . |
| 1,487,083 | 3/1924 | Zimmermann . |
| 2,692,599 | 10/1954 | Creelman . |
| 2,910,749 | 11/1959 | Parker . |
| 4,402,471 | 9/1983 | Norman ........................................ 43/4 |
| 5,816,458 | 10/1993 | Yonenoi ................... 224/182 |

*Primary Examiner*—Kurt Rowan
*Attorney, Agent, or Firm*—Merchant & Gould P.C.

[57] ABSTRACT

A device for using in fly fishing to facilitate the recovering and collection of the fishing line, the device comprising spring means capable of being firmly attached to a part of the clothes of an angler to collect the fishing line when recovering the same in the practicing of fly fishing and to keep the line accessible to be cast out again without running the risk of entangling the line.

12 Claims, 2 Drawing Sheets

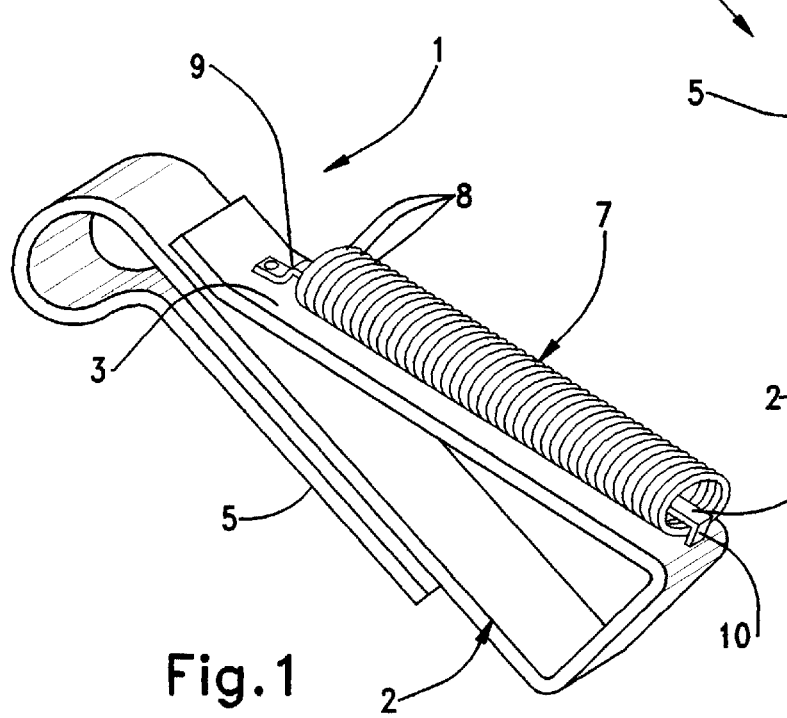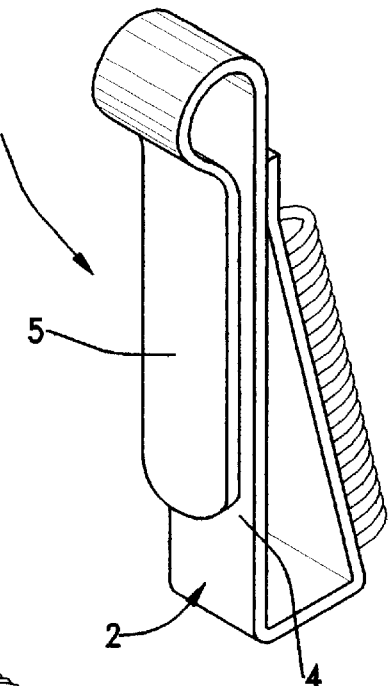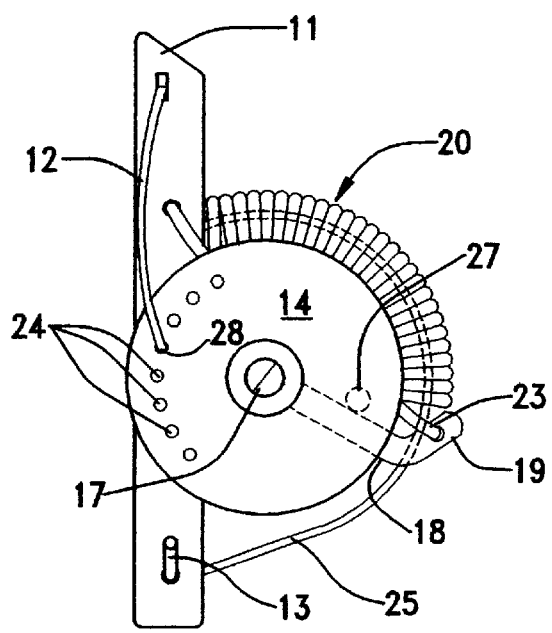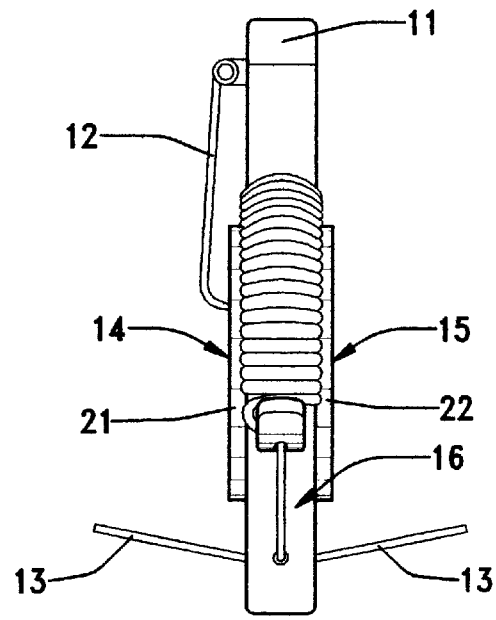

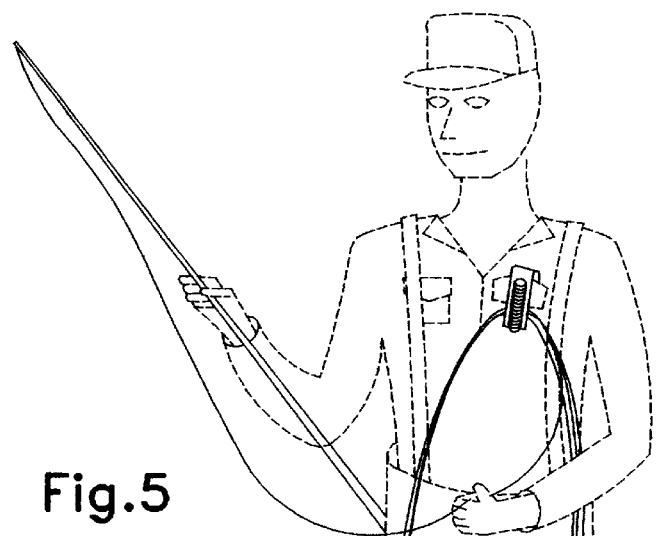
Fig.5
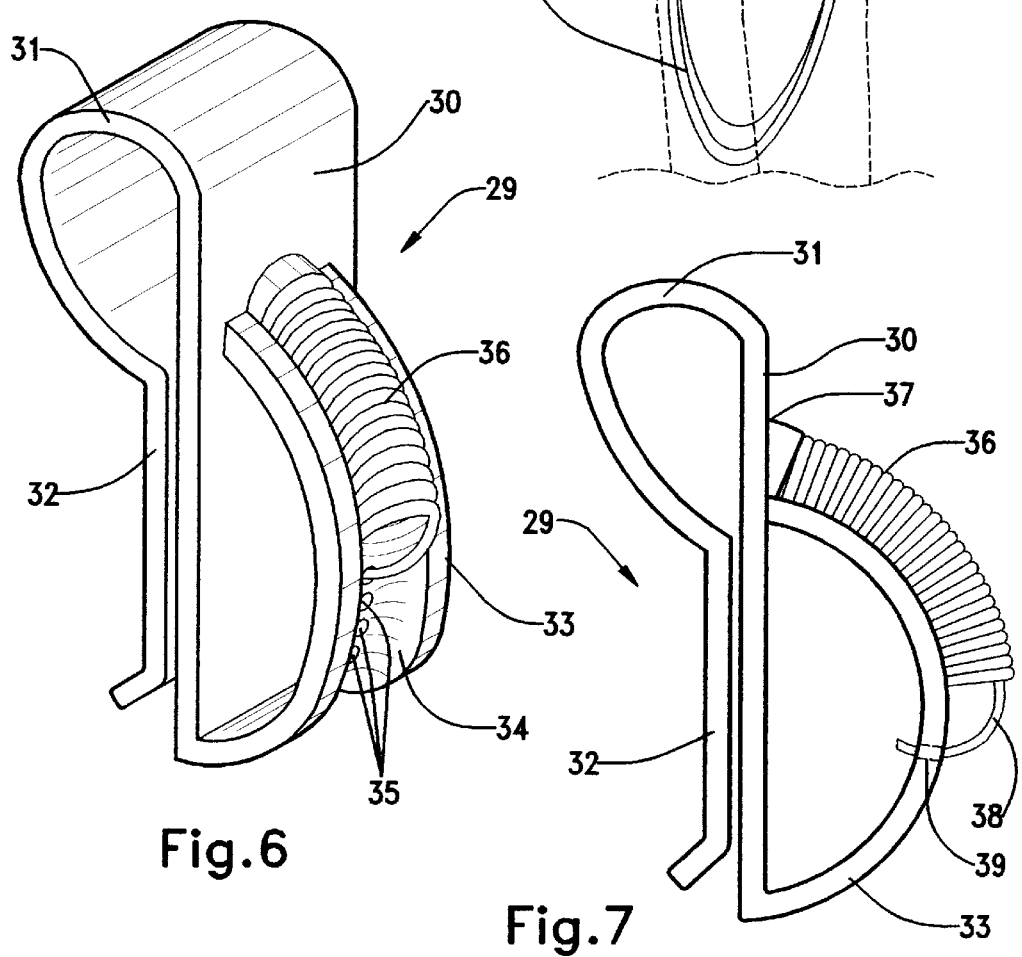
Fig.6
Fig.7

LINE RETAINING DEVICE FOR THE RECOVERING OF LINE IN FLY CASTING

BACKGROUND OF THE INVENTION

1. Field of the Invention

The present invention relates to the practicing of fishing sports and more particularly to a device for helping in the recovering of the fishing line when practicing fly fishing or fly casting.

2. Description of the Prior Art

Fly fishing, also called fly casting, is an increasingly popular method of fishing, primarily in mountain streams. Artificial lures designed to look like specific insects are attached to the end of a relatively heavy line, which is cast out by the angler. Fish such as bass, trout, or salmon are attracted to the flies, which land lightly on the water. Fly fishing requires patience to develop skill at the sport.

Once the line has been cast out the same must be recovered according to precise techniques of the sport. Although a reel is used in this kind of fishing the same is only used when a fish is trapped and the line is entirely recovered in the reel. However, during the cycles of casting out and recovering the line without trapping a fish the reel is not used. When recovering the line the same is collected by the angler and no control can be taken of the several meters of the long line which mostly fall in the water with a high risk of becoming entangled. It is required a lot of expertise and skillfulness to handle the fishing line to prevent the same from getting entangled. It is therefore a concern of most of the anglers to find a means for handling the recovered line, as well as to find the way of accommodating the line to prevent entangling thereof and have the line, after recovering thereof, collected in a manner that the same is easily ready to be cast out again.

3. Summary of the Invention

It is therefore one object of the present invention to provide a device for using in fly fishing to facilitate the recovering and collection of the line, the device comprising spring means capable of being firmly attached to a part of the clothes of an angler to collect and retain the line when the same is recovered in the practicing of fly fishing and to keep the line accessible to be cast out again without running the risk of entangling the line.

It is still another object of the present invention to provide a line retaining device for assisting in collecting and retaining a line in the stages of recovering the line when fishing by fly casting, the device comprising a back support having a front portion including a coil spring length and a rear portion having fixing means to firmly attach the device to a clothes part of an angler.

It is a further object of the present invention to provide a line retaining device for assisting in collecting and retaining a line in the stages of recovering the line when fishing by fly casting, the device comprising a support plate with a front portion comprising a flat front face of the plate, and a front face including a rectilinear bar fixed at respective opposite ends thereof to the plate and extending inside and along a tubular coil spring, whereby the coil spring is retained around the bar and between its fixed ends.

It is even another object of the present invention to provide a line retaining device for fly fishing wherein a coil spring is provided in a support bar having a pair of opposing side walls, a pair of facing discs being arranged in the bar, each disc being attached to a respective one of said opposite walls of the bar so that a gap is defined between the discs, said coil spring being slidably mounted at a periphery of the discs, the spring having an end retained in the support bar and an opposite end fixed to a distal end of a radially extending arm having a central end rotatably mounted in a shaft passing through a center of the discs, the distal end of the arm being manually operated to expand the coil spring for opening its helical turns or to retract the coil spring to close its helical turns.

BRIEF DESCRIPTION OF THE DRAWINGS

The present invention is illustrated by way of example in the following drawings wherein:

FIG. 1 is a perspective view of a device according to a first embodiment of the invention;

FIG. 2 is a perspective rear view of the device of FIG. 1;

FIG. 3 is a perspective view of a device according to a second embodiment of the invention;

FIG. 4 is a side elevation view of the embodiment shown in FIG. 3;

FIG. 5 is a schematic view of an angler when recovering the line with one of his/her hands and a length of line is shown as retained and accommodated in a device of the invention;

FIG. 6 is a front perspective view of a device according to a third embodiment of the invention; and FIG. 7 is a side elevation view of the device of FIG. 6.

DESCRIPTION OF THE PREFERRED EMBODIMENTS

Now referring in detail to the drawings it may be seen from FIGS. 1 and 2 a first embodiment of the invention comprising a device indicated by the general numeral reference 1 and including a support piece or plate 2, which may be generally made from plastics, or any other suitable material, such as metal. Support plate 2 has a front face or front portion 3 and a rear face or rear portion 4, the rear face 4 including any suitable fixing means 5 such as a resilient plastic tongue integrally made with the entire support. Tongue 5 may be attached to an upper edge of a pocket in the jacket of a fishing man, for example. It will be obvious to any man skilled in the art that tongue 5 may be replaced by any other kind of safety pin, clip or a two part retainers like the one available under the name VELCRO(R).

In the front face 3 a retaining longitudinal bar 6 is attached, the bar supporting around the same a coil extension spring 7 comprising a plurality of helical turns 8. Spring 7 may also be made from plastics or any suitable metallic material such as brass. Spring 7 remains retained along bar 6, between opposite ends 9, 10 of the bar, which ends are firmly fixed to support plate 2 and, particularly in front face 3 of the support.

When fishing, the angler attaches the device of the invention to any convenient part of his/her clothes, as it is shown in FIG. 5, for example. Upon recovering of the line without a fish having been trapped, the angler pull the line with one of his/her hands and inserts the line between the helical turns 8 of the inventive device. Thank to their resilient characteristics the helical turns may be located one against to the other (closed) or slightly spaced apart from each other (open) thus providing a strong or a weak retention force for retaining the line housed between two adjacent helical turns. The angler only has to insert the recovered line length between the spring turns without the need of caring about in which turns the line lengths are inserted. No care whether two line lengths are retained between two turns the line will be firmly retained until the same have to be cast out again. The line is retained between the helical turns of the spring with a retention force strong enough to prevent the line from falling to the floor or the water but the retention force will be, however, weak enough to live the line free upon casting out of the same, without the retention forces of the helical spring turns baring the casting out of the line. Indeed, when the line is gripped between two adjacent helical turns of the spring it is somewhat difficult to remove the line from the turns by laterally pulling the line. However, when casting the line out the resulting pulling force acts in the front of the spring, that is on the open distal portion of the helical turns, whereby the line is easily removed out of the gripping force of the helical turns. In any event the retention forces of the spring may be adjusted to the desired values by selecting a proper spring resiliency or a proper material for the spring. In addition, the spring turns may be opened by hooking the free ends of the spring in the bar ends 9, 10 so as to place the turns in a more spaced apart relationship whereby the retention forces of the spring for gripping the line will decrease. Thus, different force gripping values may be obtained to accommodate a different type and/or thickness of lines.

FIGS. 3, 4 shows another alternative of the line retaining device of the invention, comprising a support piece formed by a vertical support bar 11 having at an upper end thereof a retaining pin 12 to be attached to the angler's clothes. Retaining pin 12 may be any kind of clip or safety pin suitable to be attached to the angler's clothes. At a lower end of the vertical bar a pair of stabilizing opposite wings 13 (only one is shown in FIG. 3) are provided, located at both sides of vertical bar 11, the purpose of which wings is to rest again the angler's body to keep the device in a vertical and stable desired position.

At both sides of vertical bar 11 discs 14, 15 are arranged, both discs being parallel to each other and defining a gap 16 between the same. A shaft 17 is extended through both discs 14, 15 and a radially extending regulating arm 18 is rotatably mounted on the shaft. Arm 18 has a central end connected to the shaft and a distal end 19 extends out of the device to be accessible by the user to manually operate the same by rotating the arm around shaft 17.

A spring, preferably a coil extension spring 20, is mounted on peripheral edges 21, 22 of discs 14, 15, which discs, and particularly their peripheral edges 21, 22, define a channel along which the spring is seated and capable of easily sliding on. One turn end 23 is attached to distal end 19 of arm 18, whereby the rotation of arm 18 around shaft 17 causes the spring to be resiliently stretched or retracted. When stretched, the helical turns of the spring are spaced apart from each other (open) and the retention forces for a line housed between two turns is reduced, while the retention force is increased upon retracting the spring so as to place the helical turns closer to each other.

At least one of the discs, particularly that one indicated by reference number 14, is rotatably mounted on shaft 17 and has a plurality of orifices 24 near the periphery of the disc. The purpose of orifices 24 is to cause arm 18 to be locked in a desired circumferential position by inserting in one of the orifices a key (not shown) or, as it is shown in FIG. 3, a locking end 28 of pin 12. Disc 14 has an inner stop pin 27 which is depicted in phantom lines as long as the pin is under disc 14 and, particularly, in gap 16 between discs 14, 15. When disc 14 is locked into the desired position the stop pin keep arm 18 in the illustrated position preventing the same to be pulled by the spring beyond stop pin 27.

To improve the operation of arm 18 by keeping the spring along the periphery of discs 14, 15 a curved peripheral wire 25 is provided, the wire being fixed to opposite upper and lower ends of the vertical bar 11. Wire 25 runs along and within the tubular helical spring 20 so that the spring is kept guided along the wire preventing the spring to move out of the discs peripheries.

A third embodiment of the invention is shown in FIGS. 6, 7, wherein the device is indicated by the general reference number 29 and comprises an integral plastic made support piece having a flat portion 30 merged at an upper end thereof to a loop end 31 which in turn extends downwardly to form a retention tongue 32. Flat portion 30 is joined, at a lower end thereof, to a curved front portion 33 defining a guiding channel 34 having at a bottom area thereof a plurality of longitudinally aligned orifices 35. A helical spring 36 is nested into channel 34, the spring having an upper end fixed to the flat portion at 37, and a lower end turn 38 capable of being selectively hooked into one 39 of the orifices 35. Like in the embodiment of FIGS. 3, 4, the spring may be stretched by pulling from turn 38 and inserting this turn into a selected orifice 35, thus opening the turns of the spring. Like in the embodiment shown in FIGS. 3, 4, spring 36 is accommodated in the curved front portion so that the coil spring has helical turns with a distal portion thereof, remote from the front portion, being spaced apart from each other, while a proximal portion of the turns, close to the front portion, are close to each other.

The device illustrated in FIGS. 3, 4, 6 and 7, like in the embodiment of FIGS. 1 and 2, may be entirely made of plastics or from metal, preferably brass, and is attached to the clothes of the fishing man by means of the attaching pin or clip 12 (FIGS. 3, 4) or a tongue 32 (FIGS. 6, 7). When recovering the fishing line, the angler retains the fishing rod with one of his/her hands while the line is recovered by using the other hand. When a length of line is recovered the same is inserted between the helical turns of spring 20. The several lengths of lines form a plurality of loops 26 retained in the inventive device, thus avoiding the recovered line to be entangled as it usually occurs when conventionally fishing and the recovered line just falls in the soil or in the water where the angler is fishing.

I claim:

1. A line retaining device for assisting in collecting and retaining a fishing line in the stages of recovering the line when fishing by fly casting, the device comprising a support piece having a front portion including a coil spring length and a rear portion having fixing means to firmly attach the device to a clothes part of an angler, the front portion being curved and the coil spring being accommodated in the curved front portion so that the coil spring has helical turns with a distal portion thereof, remote from the front portion, being spaced apart from each other, while a proximal portion of the turns, close to the front portion, are close to each other, said curved front portion having a peripheral channel with a plurality of orifices in a bottom of the channel, the spring being nested into the channel and having an end turn which may be selectively hooked into one of the orifices in the bottom of the channel.

2. The retaining device of claim 1, wherein the fixing means comprise a safety pin.

3. The retaining device of claim 1, wherein the fixing means comprise a retaining clip.

4. The retaining device of claim 1, wherein the fixing means comprise a hook-and-loop retaining strip.

5. A line retaining device for assisting in collecting and retaining a fishing line in the stages of recovering the line when fishing by fly casting, the device comprising a support piece having a front portion including a coil spring length and a rear portion having fixing means to firmly attach the device to a clothes part of an angler, the support piece comprising a vertical support bar having a pair of opposing side walls, a pair of facing discs being arranged in the bar, each disc being attached to a respective one of said opposite walls of the bar so that a gap is defined between the discs, said coil spring being slidably mounted at a periphery of the discs.

6. The retaining device of claim 5, wherein the fixing means comprise a safety pin.

7. The retaining device of claim 5, wherein the fixing means comprise a retaining clip.

8. The retaining device of claim 5, wherein the fixing means comprise a hook-and-loop retaining strip.

9. The retaining device of claim 5, wherein a curved peripheral wire is extended adjacent said periphery of the discs and along and within the coil spring so as to retain the spring in position around the periphery of the discs.

10. The retaining device of claim 9, wherein the spring has an end retained in the vertical support bar and an opposite end fixed to a distal end of a radially extending regulating arm having a central end rotatably mounted in a shaft passing through a center of the discs, the distal end of the arm being manually operated to expand the coil spring for opening its helical turns or to retract the coil spring to close its helical turns.

11. The retaining device of claim 10, wherein locking means are provided in at least one of the discs to lock the radial arm in a desired position.

12. The retaining device of claim 11, wherein one of the discs are rotatably mounted in the shaft and said locking means comprise a plurality of locking orifices in the periphery of said rotating disc, the rotating disc having a stop pin extending into said gap to lock the regulating arm in a desired position, the disc being locked into position by inserting a key into a selected one of the locking orifices.

* * * * *